(12) United States Patent
Viault et al.

(10) Patent No.: US 11,480,085 B2
(45) Date of Patent: Oct. 25, 2022

(54) DEVICE FOR PURIFYING EXHAUST GAS WITH OPTIMIZED HEATING

(71) Applicant: FAURECIA SYSTEMES D'ECHAPPEMENT, Nanterre (FR)

(72) Inventors: Christophe Viault, Belfort (FR); Mathieu Capirchia, Pont de Roide (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 17/181,210

(22) Filed: Feb. 22, 2021

(65) Prior Publication Data

US 2021/0270168 A1  Sep. 2, 2021

(30) Foreign Application Priority Data

Feb. 28, 2020 (FR) ...................................... 20 02017

(51) Int. Cl.
*F01N 3/20* (2006.01)
*F01N 3/28* (2006.01)
*F01N 13/00* (2010.01)

(52) U.S. Cl.
CPC ............. *F01N 3/2013* (2013.01); *F01N 3/28* (2013.01); *F01N 13/0097* (2014.06); *F01N 2240/16* (2013.01)

(58) Field of Classification Search
CPC ...... F01N 3/2013; F01N 13/0097; F01N 3/28; F01N 2240/16; F01N 3/027
See application file for complete search history.

(56) References Cited

U.S. PATENT DOCUMENTS

| | | | |
|---|---|---|---|
| 4,319,896 A | | 3/1982 | Sweeney |
| 4,456,457 A | | 6/1984 | Nozawa et al. |
| 4,523,935 A | * | 6/1985 | Takagi ............... B01D 39/2093 219/205 |
| 5,423,904 A | * | 6/1995 | Dasgupta ............... B01D 46/62 55/282 |
| 5,567,392 A | | 10/1996 | Becker et al. |
| 7,931,715 B2 | * | 4/2011 | Gonze ..................... F01N 3/035 55/282.3 |
| 2007/0062181 A1 | * | 3/2007 | Williamson .......... F01N 13/009 60/297 |

(Continued)

FOREIGN PATENT DOCUMENTS

| DE | 102014115923 A1 | 5/2016 |
|---|---|---|
| EP | 0233860 A3 | 10/1987 |

(Continued)

OTHER PUBLICATIONS

French Preliminary Research Report dated Feb. 11, 2021 for French Patent Application No. 2002017.

*Primary Examiner* — Brandon D Lee
(74) *Attorney, Agent, or Firm* — Carlson, Gaskey & Olds, P.C.

(57) ABSTRACT

A purification device comprises a housing comprising a generally cylindrical wall extending along a longitudinal axis. At least one purification member is arranged in the housing and is intended to be arranged in an exhaust gas flow. The purification device comprises at least one heating element arranged in contact with the purification member, the heating element extending in a plane perpendicular to the longitudinal axis.

15 Claims, 5 Drawing Sheets

(56) References Cited

U.S. PATENT DOCUMENTS

| | | | | |
|---|---|---|---|---|
| 2008/0307775 A1* | 12/2008 | Gonze | ............... | F01N 3/027 |
| | | | | 60/303 |
| 2017/0226909 A1* | 8/2017 | Hirth | ............... | F01N 3/2828 |
| 2018/0291786 A1 | 10/2018 | Bartolo | | |
| 2018/0291790 A1* | 10/2018 | Bartolo | ............... | F01N 3/2828 |
| 2021/0123368 A1* | 4/2021 | Akyildiz | ............... | B01J 23/38 |

FOREIGN PATENT DOCUMENTS

| | | |
|---|---|---|
| JP | S5823187 A | 2/1983 |
| JP | 05059939 A | 9/1993 |
| JP | H07145723 A | 6/1995 |

\* cited by examiner

DEVICE FOR PURIFYING EXHAUST GAS WITH OPTIMIZED HEATING

CROSS-REFERENCE TO RELATED APPLICATIONS

This application is a U.S. non-provisional application claiming the benefit of French Application No. 20 02017, filed on Feb. 28, 2020, which is incorporated herein by reference in its entirety.

TECHNICAL FIELD

The present disclosure relates to an exhaust gas purification device intended to provide an exhaust system of a combustion engine, in particular a vehicle combustion engine.

BACKGROUND

A combustion engine exhaust system, comprising a catalytic purification device, intended to reduce polluting particles (in particular nitrogen oxides NOx, unburned hydrocarbons HC and carbon monoxide CO) into harmless particles (in particular into nitrogen dioxide $N_2$, oxygen $O_2$, carbon dioxide $CO_2$ and water $H_2O$) is already known in the state of the art. For this purpose, the exhaust gases pass through a catalytic purification unit.

It should be noted that the efficiency of the catalytic purification unit is optimal when the reaction takes place at high temperature. Thus, during a cold start, the reaction is less efficient and more polluting particles are emitted.

To overcome this disadvantage, one solution is to equip the exhaust system with an exhaust gas heating device, which heats the exhaust gases before they pass through the purification unit, until the engine emits sufficiently hot gases. This heater device is located upstream of the purification unit.

However, the integration of the heater into the purification unit is sometimes difficult, particularly for reasons of space. In addition, the exhaust gas temperature is not always homogeneous.

SUMMARY

An exhaust gas purification unit is provided that integrates a heating device that is both space-saving and efficient.

In one example, the disclosure provides an exhaust gas purification device comprising a housing comprising a generally cylindrical wall extending along a longitudinal axis and comprising of at least one purification unit arranged in the housing and intended to be arranged in an exhaust gas flow, the exhaust gas purification device comprises at least one heating element arranged in contact with the purification unit, the heating element extending in a plane perpendicular to the longitudinal axis.

Due to the direct contact between the heating element and the purification unit, the heat emitted by the heating element is directly transmitted to the purification unit without any significant heat loss between this heating element and the purification unit. As a result, the purification unit is heated more efficiently.

In addition, this direct contact reduces the size of the assembly.

A purification device according to the disclosure may furthermore comprise one or more of the following features, taken alone or in any technically conceivable combination.

The purification unit has a generally cylindrical shape extending between a first and a second surface, the purification unit comprising at least one groove provided on the first or second surface, the heating element extending into this groove.

The groove extends in a boustrophedon back and forth pattern on the first and/or second surface.

The purification unit presents a generally cylindrical shape extending between a first and a second surface, the purification device comprising two heating elements, each one in contact with respectively one of the first and second surfaces.

The purification device comprises two purification units, arranged in contact with each other, with the heating element interposed between the two purification units.

The heating element is housed inside the purification unit.

The heating element is formed by an electrically conductive cable, preferably flexible, or by an electrically conductive mesh, preferably flexible.

The disclosure also relates to an exhaust system of an internal combustion engine, the exhaust system comprising a purification device as previously defined.

Finally, the disclosure relates to a vehicle, the vehicle comprising an exhaust system as defined above.

BRIEF DESCRIPTION OF THE DRAWINGS

Different aspects and advantages of the disclosure will be highlighted in the description which follows, given solely by way of example and made with reference to the appended figures, among which are the following.

DETAILED DESCRIPTION

Figure 1:
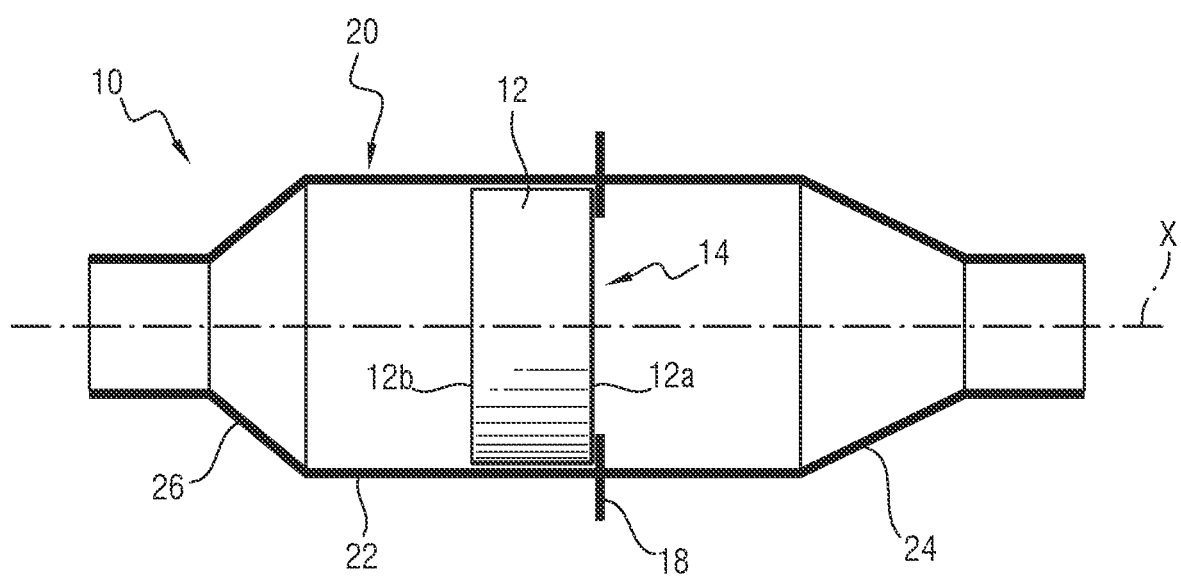
FIG. 1 is a schematic profile view of a purification device according to a first example of embodiment of the disclosure.

An exhaust gas purification device 10 intended to be inserted in an exhaust system of an internal combustion engine is shown in FIG. 1. The internal combustion engine is, for example, that of a vehicle, in particular a motor vehicle, but could alternatively be any other internal combustion engine.

The purification device 10 comprises, in a manner known per se, a catalytic purification unit 12, allowing the reduction of polluting particles (in particular nitrogen oxides NOx, unburned hydrocarbons HC and carbon monoxide CO) into harmless particles (in particular nitrogen dioxide $N_2$, oxygen $O_2$, carbon dioxide $CO_2$ and water $H_2O$).

Since oxidation-reduction reactions are more efficient at high temperatures, the purification unit includes a heater 14 designed to heat the exhaust gases passing through the purification unit, particularly during a cold start of the internal combustion engine.

The heater 14 comprises of at least one heating element 16, which will be described in more detail later, as well as at least one electrode 18 intended to supply the heating element 16 with electricity, so that the heating element 16 heats by the Joule effect.

The heating element 16 is thus formed, for example, by an electrically conductive cable or an electrically conductive mesh. Preferably, the cable or the mesh is flexible. Alternatively, the heating element 16 is formed by the deposition of an electrically conductive compound.

The purification device 10 comprises a housing 20 with a generally cylindrical wall 22 extending along a longitudinal axis X. The term "cylindrical" is of course to be taken in the broadest sense, as being able to present a base of any conceivable shape. For example, the wall 22 has a generally cylindrical shape with a circular base. It could, however, alternatively present an oval or rectangular base with rounded corners, or any other possible base.

The purification unit 12 is housed in the housing 20, surrounded by the wall 22. Thus, the exhaust gases flowing through the housing 20 pass through the purification unit 12.

The heating element 16 is also housed in the housing 20, surrounded by the wall 22. Thus, the exhaust gas flowing through the housing 20 is heated by the heating element 16. Preferably, the electrodes 18 pass through the wall 22 to be connected to an external source of electricity.

The housing 20 preferably also comprises an inlet section 24 and an outlet section 26, preferably of at least a partially truncated conical shape, for connection to pipes upstream and downstream of the exhaust system respectively. The wall 22 extends in the direction of the longitudinal axis X between the inlet section 24 and the outlet section 26.

Figure 2:
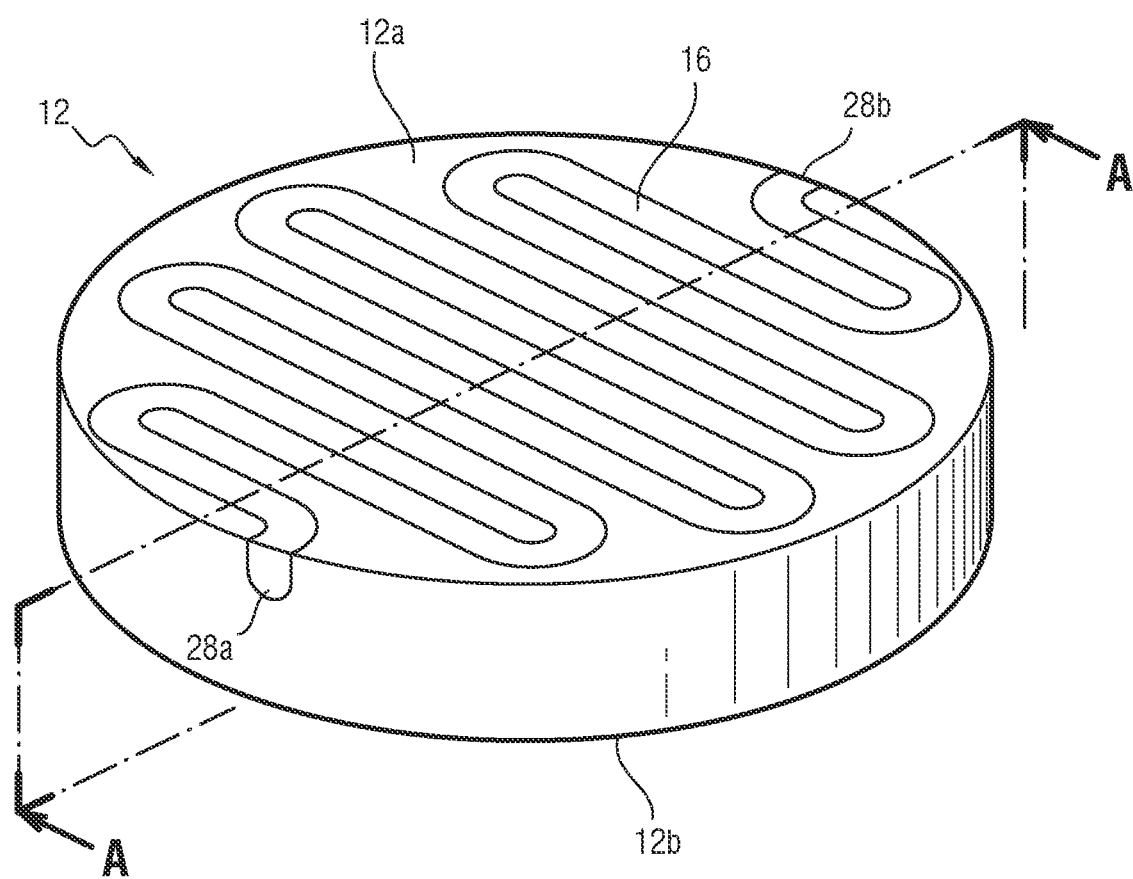
FIG. 2 is a perspective view of a purification unit of the device of FIG. 1.
Figure 3:
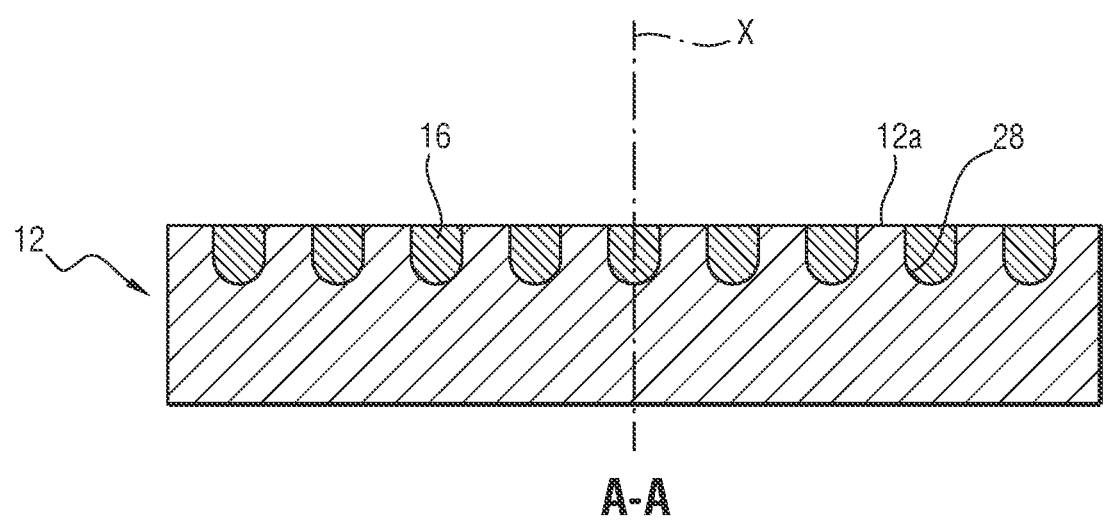
FIG. 3 is a sectional view according to a sectional plane A-A of the purification unit of FIG. 2.

The purification unit 12 and the heating element 16 are shown in more detail in FIG. 2.

According to the first embodiment, the purification unit 12 presents a generally cylindrical shape extending in the direction of the longitudinal axis X between a first surface 12a and a second surface 12b.

The term "cylindrical" is of course to be taken in its broadest sense, as being able to present a base of any conceivable shape. For example, the purification unit 12 has a general cylindrical shape with a circular base. It could, however, alternatively present an oval or rectangular base with rounded corners, or any other possible base.

For example, the purification unit 12, presents a height, considered in the direction of the longitudinal axis X, greater than or equal to 25 mm, and more preferably greater than or equal to 50 mm, and even more preferably greater than or equal to 75 mm.

The first surface 12a is for example an upstream surface, facing the inlet section 24, and the second surface 12b is a downstream surface, facing the outlet section 26.

In accordance with the disclosure, the heating element 16 is arranged in contact with the purification unit 12. The term "arranged in contact" means that there is no clearance provided between the heating element 16 and the purification unit 12.

It should be noted that contact may be partial when the heating element 16 is formed by a cable or a mesh, due to vagaries related to the design of the device. In particular, the amount of heating element 16 in contact with the purification unit 12 depends on the tension applied to the cable or mesh. Preferably, at least 50% of the surface of the heating element 16 is in contact with the purification unit.

Furthermore, it should be noted that when the heating element 16 is a conductive material deposited on the purification unit 12, the heating element 16 is entirely in contact with the purification unit 12.

The heating element 16 extends in a plane substantially perpendicular to the longitudinal axis X. Thus, the heating element is substantially perpendicular to the exhaust gas flow.

The heating element 16 is at least partially housed in the purification unit 12.

In the example described, the purification unit 12 comprises, on its first surface 12a, at least one groove 28 in which the heating element 16 is housed. The groove(s) 28 extend according to a shape complementary to that of the heating element 16, so that the heating element 16 can be housed in this groove(s) 28.

In the example described, the heating element 16 is formed by an electrically conductive cable. The first surface 12a then has a single groove 28, in which the heating element 16 extends.

In the example described, the groove 28 extends in a boustrophedon back and forth pattern over the entire first surface 12a, between the first 28a and a second 28b ends, both of which open at a peripheral edge of the purification unit 12.

It will be recalled here that the terms "boustrophedon back and forth" refers to a continuous line extending alternately from one edge to the other of the purification unit, changing direction at each edge. The groove 28 thus forms substantially parallel lines each connected at each of its ends to a respective adjacent line.

For example, the first 28a and second 28b ends open in opposite directions, at 180° from each other. Alternatively, the first 28a and second 28b ends could open in directions forming a non-zero angle between them, for example between 0 and 45°.

Figure 5:
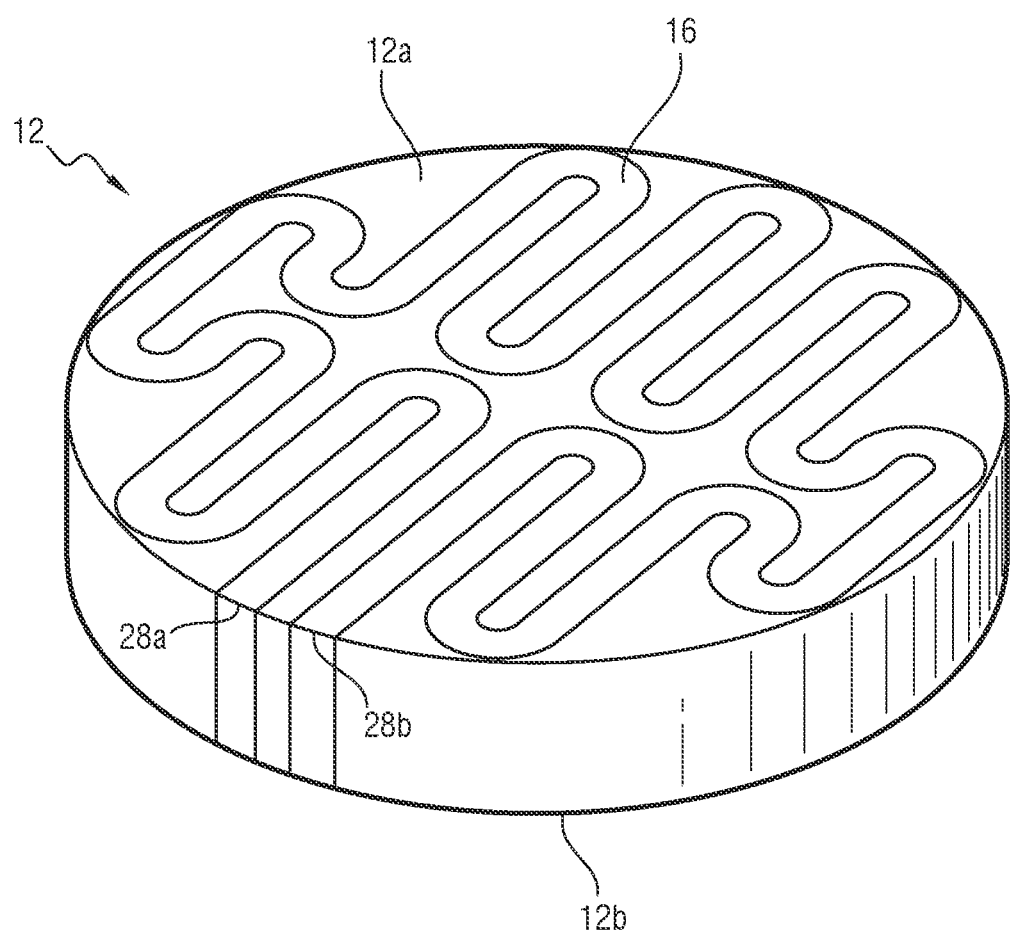
FIG. 5 is a view similar to FIG. 2 of a purification unit according to an embodiment variant.

According to another variant, shown in FIG. 5, the groove 28 extends continuously over both surfaces 12a, 12b of the purification unit 12. The first 28a and second 28b end then open in a parallel direction forming a zero angle with each other. Only one of the surfaces 12a is visible in FIG. 5, the other surface 12b being, for example, substantially identical.

The heating element 16 extends in the groove 28 (thus also boustrophedon back and forth, to cover most of the first surface 12a), and is connected at each of the first 28a and second 28b ends to a respective one of the electrodes 18.

Note that alternatively, the groove 28 could extend in any other possible shape on the first 12a or second 12b surface, for example in a spiral. In the case of a spiral, only one end of the groove opens at the peripheral edge of the purification unit 12, and the other end is located approximately in the center of the surface 12a, 12b.

In the case where the heating element 16 is formed by an electrically conductive mesh, the first surface 12a could present a multitude of intersecting grooves to accommodate the said mesh.

According to another variant, the groove(s) 28 is (are) provided on the second surface 12b.

According to another variant, the grooves 28, 28' are provided on both surfaces 12a, 12b, and each receives a respective heating element 16.

Figure 4:
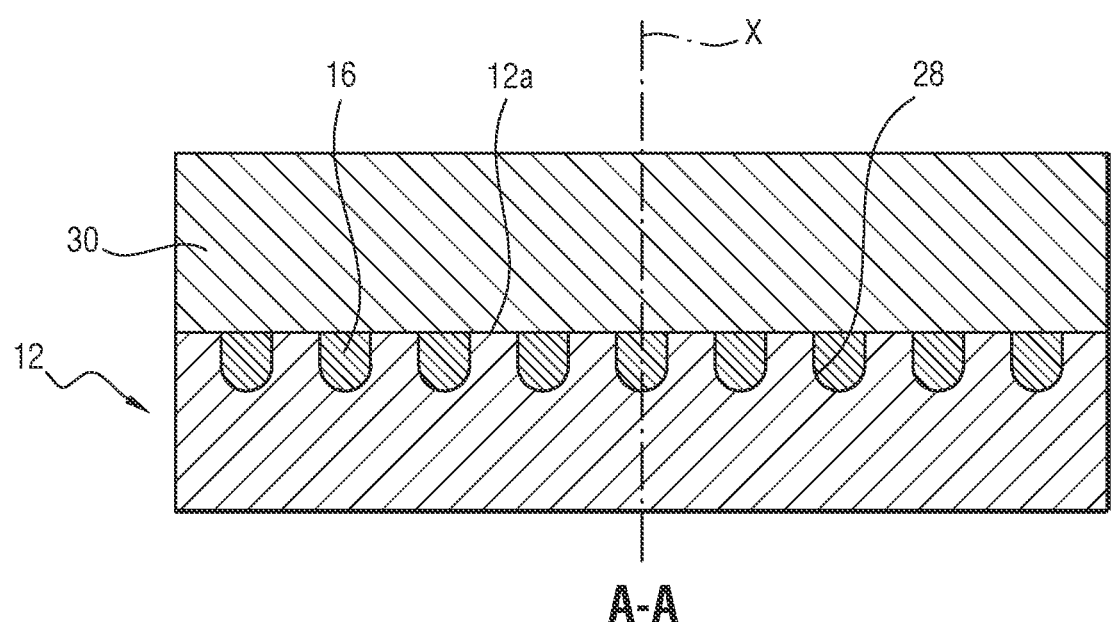
FIG. 4 is a longitudinal sectional view of the purification units of a purification device according to a second example of embodiment of the disclosure.

A purification device has been shown in FIG. 4 according to a second example of an embodiment of the disclosure. In this figure, the elements similar to those in the previous figures are designated by identical references.

According to this second embodiment, the purification device 10 comprises two purification units, namely a first purification unit 12 similar to that previously described, and a second purification element 30.

The second purification element 30 is preferably arranged in contact with the first purification unit 12, and more particularly with the first surface 12a of this first purification unit 12.

Thus, according to the example described, the heating element 16 is interposed between the first purification unit 12 and the second purification element 30.

In the described example, only the first purification unit 12 comprises the groove 28 housing the heating element 16. Alternatively, the second purification element 30 could also present a groove, so that the heating element 16 would be housed in both the groove 28 of the first purification unit 12 on one side, and the groove of the second purification element 30 on the other side.

Other variants are possible. For example, at least one of the purification units 12, 30 carries another heating element on the surface opposite to the one in contact with the other purification unit.

Note that, in the embodiment described, the second purification element 30 is on the inlet side of the inlet section 24, and the first purification unit 12 is on the outlet side of the outlet section 26. However, as an alternative, the reverse can also be considered.

Preferably, the second purification element 30 has similar dimensions to those of the first purification unit 12. For example, each of the first 12 and second 30 purification units presents a height, considered in the direction of the longitudinal axis X, of approximately 50 mm.

Alternatively, the second purification element 30 could present a height greater than the height of the first purification unit 12. In this case the height is greater than or equal to 50 mm, and preferably greater than or equal to 75 mm, and even more preferably greater than or equal to 100 mm.

It should be noted that the disclosure is not limited to the embodiments previously described, but could present different variants.

For example, the heating element 16 could be housed integrally in the purification unit 12, rather than in a groove running on a surface of this purification unit. For this purpose, a duct is provided in the purification unit 12, the heating element 16 being housed in this duct, at least partially in contact with the wall radially delimiting this duct.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A purification device for purifying exhaust gases, comprising:
   a housing including a wall of generally cylindrical shape extending along a longitudinal axis;
   at least one purification unit arranged in the housing and intended to be arranged in an exhaust gas flow, wherein the purification device comprises at least one heating element arranged in contact with the at least one purification unit, the at least one heating element extending in a plane perpendicular to the longitudinal axis, and wherein the at least one heating element is formed by the deposition of an electrically conductive compound; and
   wherein the at least one heating element extends in a groove formed in at least one of an upstream and downstream surface of the at least one purification unit, and wherein the groove extends between a first end and a second end that are at a peripheral edge of the at least one purification unit opposite from each other, and wherein the at least one heating element is connected at each of the first and second ends to an electrode.

2. The purification device according to the claim 1, wherein the at least one purification unit presents a generally cylindrical shape extending between the upstream surface and the downstream surface.

3. The purification device according to the claim 2, wherein the groove extends in a boustrophedon back and forth pattern on the upstream and/or downstream surface.

4. The purification device according to claim 1, wherein the at least one purification unit presents a generally cylindrical shape extending between the upstream surface and the downstream surface, and wherein the at least one heating element comprises two heating elements, each in contact with a respective one of the upstream and downstream surfaces.

5. The purification device according to claim 1, wherein the at least one purification unit presents a generally cylindrical shape extending between the upstream surface and the downstream surface, the at least one heating element extending in contact with each of the upstream and downstream surfaces.

6. The purification device according to claim 1, wherein the at least one purification unit comprises two purification units arranged in contact with each other, the at least one heating element being interposed between the two purification units.

7. The purification device according to claim 1, wherein the at least one heating element is housed inside the at least one purification unit.

8. The purification device according to claim 1, wherein the at least one heating element is entirely in contact with the at least one purification unit.

9. The purification device according to claim 1, wherein the at least one purification unit comprises a catalytic substrate positioned within the housing.

10. An internal combustion engine exhaust system, comprising:
    a purification device for purifying exhaust gases, the purification device comprising a housing including a wall of generally cylindrical shape extending along a longitudinal axis, and the purification device comprising at least one purification unit arranged in the housing and intended to be arranged in an exhaust gas flow, wherein the purification device comprises at least one heating element arranged in contact with the at least one purification unit, the at least one heating element extending in a plane perpendicular to the longitudinal axis, and wherein the at least one heating element is formed by the deposition of an electrically conductive compound; and
    wherein the at least one heating element extends in a groove formed in at least one of an upstream and downstream surface of the at least one purification unit, and wherein the groove extends between a first end and a second end that are at a peripheral edge of the at least one purification unit opposite from each other, and wherein the at least one heating element is connected at each of the first and second ends to an electrode.

11. The internal combustion engine exhaust system according to claim 10, wherein the at least one heating element is entirely in contact with the at least one purification unit.

12. The internal combustion engine exhaust system according to claim 10, wherein the at least one purification unit comprises a catalytic substrate positioned within the housing.

13. A vehicle comprising:
- an internal combustion engine exhaust system comprising a purification device for purifying exhaust gases, the purification device comprising a housing including a wall of generally cylindrical shape extending along a longitudinal axis, and the purification device comprising at least one purification unit arranged in the housing and intended to be arranged in an exhaust gas flow, wherein the purification device comprises at least one heating element arranged in contact with the at least one purification unit, the at least one heating element extending in a plane perpendicular to the longitudinal axis, and wherein the at least one heating element is formed by the deposition of an electrically conductive compound; and
- wherein the at least one heating element extends in a groove formed in at least one of an upstream and downstream surface of the at least one purification unit, and wherein the groove extends between a first end and a second end that are at a peripheral edge of the at least one purification unit opposite from each other, and wherein the at least one heating element is connected at each of the first and second ends to an electrode.

14. The vehicle according to claim 13, wherein the at least one heating element is entirely in contact with the at least one purification unit.

15. The vehicle according to claim 13, wherein the at least one purification unit comprises a catalytic substrate positioned within the housing.

* * * * *